US011135760B2

(12) United States Patent
van Peer et al.

(10) Patent No.: US 11,135,760 B2
(45) Date of Patent: Oct. 5, 2021

(54) PROCESS FOR FORMING ARTICLES FROM EXTRUDED POLYMER SHEET

(71) Applicant: SABIC Global Technologies B.V., Bergen op Zoom (NL)

(72) Inventors: Cornelis Johannes Gerardus Maria van Peer, Bergen op Zoom (NL); Sven Christian Hardel, Wettendorf (DE); Geert Boven, Steenbergen (NL)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 693 days.

(21) Appl. No.: 14/913,103

(22) PCT Filed: Aug. 20, 2014

(86) PCT No.: PCT/IB2014/063992
§ 371 (c)(1),
(2) Date: Feb. 19, 2016

(87) PCT Pub. No.: WO2015/025285
PCT Pub. Date: Feb. 26, 2015

(65) Prior Publication Data
US 2016/0200031 A1     Jul. 14, 2016

Related U.S. Application Data

(60) Provisional application No. 61/867,784, filed on Aug. 20, 2013.

(51) Int. Cl.
*B29C 51/14*     (2006.01)
*B05D 5/06*     (2006.01)
(Continued)

(52) U.S. Cl.
CPC ............... *B29C 51/14* (2013.01); *B05D 5/06* (2013.01); *B29C 43/10* (2013.01); *B29C 51/002* (2013.01);
(Continued)

(58) Field of Classification Search
None
See application file for complete search history.

(56) References Cited

U.S. PATENT DOCUMENTS 3,515,579 A * 6/1970 Shepherd ............... B05D 7/26
106/13
4,034,054 A * 7/1977 Sauer ................... B29C 51/04
264/313
(Continued)

FOREIGN PATENT DOCUMENTS

CN     101808803 B     3/2013
DE     3840542 C1     11/1989
(Continued)

OTHER PUBLICATIONS

Lai, Thickness Variation in the Thermoforming of Poly(methyl Methacrylate) and High-Impact Polystyrene Sheets, 1975, Journal of Applied Polymer Science, vol. 19, pp. 1805-1814. (Year: 1975).*
(Continued)

*Primary Examiner* — Monica A Huson
*Assistant Examiner* — Kelsey C Grace
(74) *Attorney, Agent, or Firm* — Cantor Colburn LLP (57) ABSTRACT

Method for forming a transparent article comprising: heating a polymer sheet 40 to form a heated sheet; creating a pressure differential across the heated sheet; pushing the heated sheet onto the contoured surface 20 to form a shaped article; and releasing the shaped article from the mold 12. Also included herein are articles made therefrom.

18 Claims, 6 Drawing Sheets

(51) Int. Cl.
| | |
|---|---|
| *B29C 51/10* | (2006.01) |
| *B29C 43/10* | (2006.01) |
| *B29C 51/00* | (2006.01) |
| *B29L 11/00* | (2006.01) |
| *B29C 43/32* | (2006.01) |
| *B29K 69/00* | (2006.01) |

(52) U.S. Cl.
CPC .......... *B29C 51/10* (2013.01); *B05D 2201/02* (2013.01); *B05D 2518/00* (2013.01); *B29C 2043/3222* (2013.01); *B29C 2791/006* (2013.01); *B29C 2791/007* (2013.01); *B29K 2069/00* (2013.01); *B29K 2995/0026* (2013.01); *B29L 2011/00* (2013.01)

(56) References Cited

U.S. PATENT DOCUMENTS

| | | | |
|---|---|---|---|
| 5,108,530 | A | 4/1992 | Niebling, Jr. et al. |
| 5,545,450 | A | 8/1996 | Anderson et al. |
| 6,257,866 | B1 | 7/2001 | Fritz et al. |
| 6,411,029 | B1 | 6/2002 | Czak |
| 6,506,334 | B1 | 1/2003 | Ellison et al. |
| 6,749,794 | B2 | 6/2004 | Spengler |
| 7,144,540 | B2 | 12/2006 | Tziovaras et al. |
| 7,854,983 | B2 | 12/2010 | Pickett et al. |
| 2002/0160214 | A1 | 10/2002 | Hirosue et al. |
| 2007/0126152 | A1 | 6/2007 | Chisholm |
| 2008/0020210 | A1 | 1/2008 | Griffin et al. |
| 2013/0177729 | A1 | 7/2013 | Ostrander et al. |
| 2016/0200031 | A1 | 7/2016 | Van Peer et al. |

FOREIGN PATENT DOCUMENTS

| | | | |
|---|---|---|---|
| DE | 3844584 | A1 | 6/1990 |
| DE | 19832570 | A1 | 2/2000 |
| DE | 19957850 | A1 | 6/2001 |
| DE | 10003699 | A1 | 8/2001 |
| DE | 10151281 | A1 | 3/2003 |
| DE | 10312610 | A1 | 9/2004 |
| DE | 10319392 | A1 | 11/2004 |
| DE | 102008050564 | A1 | 4/2010 |
| DE | 102010021892 | A1 | 12/2011 |
| DE | 102007046472 | B4 | 12/2013 |
| DE | 102013000400 | A1 | 7/2014 |
| EP | 0691201 | B1 | 10/2004 |
| EP | 2322339 | A2 | 5/2011 |
| GB | 2255524 | A | 11/1992 |
| JP | 2003200486 | A | 7/2003 |
| JP | 2006130774 | A | 5/2006 |
| WO | 9908852 | A1 | 2/1999 |

OTHER PUBLICATIONS

"Markrolon 2558" Bayer Mayer MaterialScience, Medical Polymer eNews; (2005) p. 1.
Chinese Patent No. 101808803; Date of Publication: Mar. 27, 2013; Machine Translation; 37 pages.
European Patent No. 0691201; Date of Publication: Oct. 13, 2004; Machine Translation; 17 pages.
European Patent No. 2322339(A2); Date of Publication: May 18, 2011; Machine Translation; 39 Pages.
German Patent No. 10003699; Date of Publication: Aug. 9, 2011; Machine Translation; 7 pages.
German Patent No. 10151281; Date of Publication: Mar. 20, 2003; Abstract only, 1 page.
German Patent No. 102007046472; Date of Publication: Dec. 24, 2013; Machine Translation; 23 Pages.
German Patent No. 102008050564; Date of Publication: Apr. 1, 2010; Machine Translation; 30 Pages.
German Patent No. 102010021892(A1); Date of Publication: Dec. 1, 2011; Machine Translation; 56 Pages.
German Patent No. 102013000400; Date of Publication: Jul. 17, 2014; Machine Translation; 24 Pages.
German Patent No. 10312610; Date of Publication: Sep. 30, 2004; Machine Translation; 5 pages.
German Patent No. 10319392; Date of Publication: Nov. 18, 2004; Machine Translation; 6 pages.
German Patent No. 19832570; Date of Publication: Feb. 17, 2000; Machine Translation; 12 pages.
German Patent No. 19957850(A1); Date of Publication: Jun. 7, 2001; Machine Translation; 14 Pages.
German Patent No. 3840542; Date of Publication: Nov. 2, 1989; Abstract Only; 2 pages.
German Patent No. 3844584; Date of Publication: Jun. 7, 1990; Abstract only; 1 Page.
Hytech Forming the Future Presentation (Apr. 2007); pp. 1-21.
Hytech Worldwide: Turnkey IML Solutions (Feb. 6, 2007); HyTech Forming Solutions; pp. 1-32.
International Search Report for International Application No. PCT/IB2014/063992; International Filing Date: Aug. 20, 2014; dated Feb. 23, 2015; 6 Pages.
Japanese Patent No. 2003200486; Date of Publication: Jul. 15, 2003; Machine Translation; 9 pages.
Japanese Patent No. 2006130774; Date of Publication: May 25, 2006; Machine Translation; 25 Pages.
McConnell, William K. "Bill", Jr., Thermoforming Technology, 1988-2001, revised Feb. 14, 2001, pp. 75-76.
Nelson Russell D., Hy-Tech AF2016 Manual of the Accuform 2016 Machine, Oct. 5, 2007, pp. 4.
Plastics Engineering Handbook of the Society of the Plastics Industry, 5th edition, 1991, Chapman & Hall, New York, NY, pp. 404-406.
Plexiglas GS/Plexiglas XT Product Description; Evonik Industries (Jul. 2008) 8 Pages.
Ring, Koon-Ling et al., "Specialty Films", Specialty Polymers, Aug. 2003, pp. 88-90.
SAMK 650; Product Information & Technical Data; Niebling; Obtained Oct. 9, 2012; 13 Pages.
Scheirs, J., Compositional and Failure Analysis of Polymers, John Wiley & Sons, Ltd., 2000, West Sussex, England, pp. 595-597.
Statutory Declaration/Affidavit of Mr. Fred. Himmelein; HyTech Forming Solutions USA Inc.; Executed Apr. 12, 2012; 3 Pages.
Written Opinion of the International Searching Authority for International Application No. PCT/IB2014/063992; International Filing Date: Aug. 20, 2014; dated Feb. 23, 2015; 5 Pages.

* cited by examiner

PROCESS FOR FORMING ARTICLES FROM EXTRUDED POLYMER SHEET

CROSS REFERENCE TO RELATED APPLICATIONS

This application is a 371 of International Application No. PCT/IB2014/063992, filed Aug. 20, 2014, which claims priority to U.S. Application No. 61/867,784, filed Aug. 20, 2013 which are incorporated herein by reference in their entirety.

TECHNICAL FIELD

The present disclosure relates generally to the formation of articles using sheet and sheet technology and, more particularly, to processes for forming articles from extruded polymer sheet.

BACKGROUND

Transparent parts produced from thermoplastic extruded sheet can typically be manufactured by various forming processes. These processes, however, are generally slow, labor intensive, and limited in design options. For example, when the part to be produced is complex (includes various intricate detail), only a select few forming techniques are suitable for use.

One type of forming technique suitable for producing complex parts is vacuum forming. In vacuum forming processes, polymer material is heated until it becomes pliable, and then it is placed over a mold and drawn in by a vacuum until it takes on the desired shape. In using this technique, however, uneven contact of the material with the surfaces of the mold often results in finished parts having surface defects.

One type of vacuum forming technique is vacuum assisted plug and ring forming, which is capable of producing moderately complex parts. In plug and ring forming, polymer material in sheet form is stretched over a ring, and a plug (male mold) is pressed into the polymer material to draw it into shape. One drawback with this technique is that excessive mark-off occurs, particularly at the inside corners of the formed part. Mark-off is the formation of marks from the mold surfaces on the finished part.

Another vacuum forming technique is drape vacuum forming, which is suitable for producing simple or only minimally complex parts. Parts such as windshields for vehicles can be draped formed from polycarbonate material having a thickness of about 3 millimeters (mm) in about 30 minutes or more. Forming using the drape vacuum forming technique involves stretching material in sheet form over a male mold before the material is cooled to a point where it does not flow anymore.

To produce highly complex parts, techniques such as injection molding are used. Injection molding techniques in particular typically have very high costs due to expenses relating to the injection molding equipment and also due to the manufacturing of molds for each product shape/model. In processes utilizing injection molding techniques, large volumes of parts produced are generally desired to render the processes cost effective.

There is a continued need in the art for improved molding techniques and products.

BRIEF DESCRIPTION

Disclosed herein are methods for making transparent articles and articles made therefrom.

In one embodiment, a method for forming a transparent part comprises clamping a sheet over a contoured surface of a mold, heating the sheet, stretching the sheet across the contoured surface, blowing the stretched sheet onto the contoured surface to form a shaped article, and removing the shaped article from the mold.

In another embodiment, a method for forming a transparent article comprises: heating a polymer sheet to form a heated sheet; creating a pressure differential across the heated sheet; pushing the heated sheet onto the contoured surface to form a shaped article; and releasing the shaped article from the mold.

The above described and other features are exemplified by the following Figures and Detailed Description.

DETAILED DESCRIPTION

One technique for forming complex transparent parts employs a pressure forming technique, such as is disclosed in U.S. Pat. No. 5,108,530 to Niebling, Jr. et al. The pressure forming technique utilizes high pressure (up to 300 bars (for example 50 to 300 bars, or 70 to 300 bars) and non-contact heating of the part being formed. Since there is no contact between a heating element and the part being formed (heating generally being by radiation), pressure and temperature can be controlled independently to allow for the generation of part-specific temperature profiles. It has been surprisingly found that using pressure forming technique, parts of desirably high optical quality can be produced by using lower temperatures and lower cycle times of forming and no need of predrying (as compared to other techniques) and by using a polished mold. In particular, none of the forming processes heretofore employed formed transparent parts of the level of optical quality obtainable with pressure forming (e.g., uniformity of thickness, lower stress, and replication of mold geometry). For example, none have demonstrated the combination of design freedom, speed, and optical quality as the processes described below. The technique enables the formation of optical quality sheets having a thickness of greater than 2 millimeters (mm), specifically greater than 2.5 mm, more specifically, greater than or equal to 3.0 mm, e.g., 2 mm to 18 mm, 3 mm to 18 mm).

The parts are formed by applying the non-contact heating and pressure to extruded sheets of raw material. Raw materials that may be used are generally semi-crystalline or amorphous in structure. Upon heating such a raw material in sheet form to a certain known temperature (e.g., the softening temperature), the raw material softens and flows. Manipulation of the material at or above this temperature allows for the formation of the material into articles. Raw materials for use with this technique include, but are not limited to polycarbonates, polyethylene terephthalate glycol, and the like. Such materials may be coated or glazed for protection from UV light and/or abrasion. Polycarbonate used with the techniques described herein may be LEXAN™, which is available from SABIC Innovative Polymers IP B.V., Makrolon™ available from Bayer Materials Science, Panlite™ available from Teijin Chemicals Ltd, Iupilon™ available from Mitsubishi Engineering Polymers, and others. Regarding abrasion resistance coatings, possible coatings include formable coatings such as formable silicon hard coats, formable melamine coatings, formable polyurethane coatings and formable acrylic coatings. e.g. FMR56XT is polycarbonate sheet with a formable melamine coating.

One process utilizing pressure forming is based on a controlled heating of an extruded sheet of the raw material and a forming of the sheet into an article by pressing the softened sheet onto a mold using pressurized gas (e.g., air). In heating the raw material to the temperature where the material deflections under load, (as determined by ISO75-2, .g., a temperature higher than the HDT, such as greater than the HDT to HDT+40° C.) softening temperature of the material, temperatures are low compared to other forming techniques. The raw material can be heated, e.g., so that at least one side of the entire film section or of the predominant part of the film section, has a film surface temperature of 10 to 65° C., specifically 15 to 65° C., more specifically, 20 to 65° C., and more specifically, 25 to 60° C. above the Vicat softening temperature B/50, wherein the Vicat softening temperature B/50 of a thermoplastic is according to ISO 306 (50 N; 50° C./h).

Using pressure forming to form the sheet as described herein, a sheet of raw material can be formed into an article or part having a complex shape. The sheet (also referred to as the substrate) can, for example, have a thickness of 0.75 millimeters (mm) to 18 millimeters, specifically, 1 mm to 15 mm, more specifically, 2 mm to 15 mm, and still more specifically, 2.5 mm to 12 mm.

In using pressure forming as described herein, high forces are generally expected to form relatively thick sheets into articles or parts at low forming temperatures (where the sheets are still quite stiff). However, the process of utilizing pressure forming allows for the formation of polycarbonate sheet into a three dimensional form within a shorter time frame. On top of the shorter cycle time during forming, the overall cycle time is dramatically decreased because pre-drying polycarbonate sheet was not necessary, facilitating the forming process logistics and making a drying oven obsolete. Unexpectedly, the optical quality, degree of forming, and residual stress level in the finished article or part are of a quality that is improved relative to comparable parts formed by other techniques (e.g., drape forming or other vacuum forming).

Figure 1:
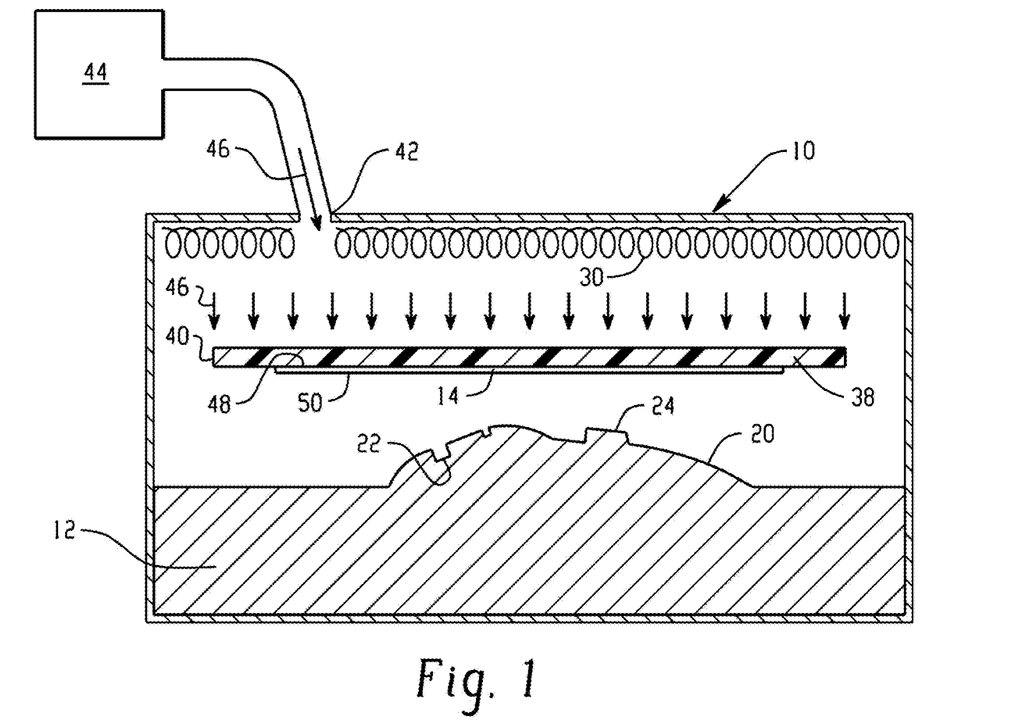
FIG. 1 is a schematic sectional view of one exemplary embodiment of a mold for forming a part using methods disclosed herein.

As shown in FIG. 1, a pressure chamber 10 comprises a mold 12 for forming an article or part having a complex shape and being transparent. The mold 12 includes a contoured surface 20 that defines the overall shape of the part. The contoured surface 20 may be configured to define ribbing in the article or part to be produced (e.g., the contoured surface 20 can include cavities 22 and/or raised portions (protrusions) 24). The mold 12 can be composed of any material that can be formed into the desired shape (including surface conditions (e.g., smoothness, features, etc.), and withstand the temperatures and pressures of the molding process. For example, the mold can be polished metal (e.g., aluminum, steel, nickel, titanium, or the like), or a composite, (e.g., aluminum filled epoxy resin).

Heating of the substrate can optionally be accomplished in the pressure chamber. The pressure chamber 10 can further comprise a mold. The heater 30 can be an array of heating elements (e.g., infrared (IR) heating elements) that enables uniform heating of the sheet. The heating elements can be ceramic, halogen, quartz, metals, and so forth. Each element can be controlled independently so heating of the sheet can be optimized to have, e.g., a very homogeneous temperature. The pressure chamber 10 can be in fluid communication with a fluid (e.g., gas) source 44 via inlet 42. Optionally the heating can be with the aid of infrared heating, convection heating, high frequency heating or with the aid of another heating measure, or a combination comprising at least one of the foregoing. For example, convection heating with the aid of hot air or heating liquid or hot bath as the source of heat, or radiant heating, for example with the aid of infrared radiation and/or quartz heaters. Since high frequency heating is less desirable (e.g., because in this case the core region is also heated to the surface temperature), in some embodiments, the heating is not achieved by high-frequency heating.

Air is compressed and creates a force on the surface of the sheet 40 opposite the mold 12, and in the direction of the mold 12 (see the arrows). The compressed air 46 compresses the sheet against the surface 20 of the mold 12. The compressed air 46 can be introduced into the pressure chamber 10 at a pressure sufficient to force the sheet against the mold surface and attain a replication of greater than or equal to 90%. For example, the gas can be introduced to the pressure chamber 10 at a pressure of less than or equal to 300 bars, specifically, less than or equal to 200 bar, more specifically, less than or equal to 150 bars. The gas can be introduced to the pressure chamber 10, such that the pressure on the gas side 48 of the sheet 40 (i.e., the side opposite the mold 12), is greater than the pressure on the mold side 50 of the sheet 40.

Once the sheet 14 has been forced against the surface 20, it can then be cooled (e.g., actively or passively) to produce the desired article. Within such temperature and pressure ranges (e.g., temperature of greater than or equal to HDT and a pressure differential of 50 to 300 bar (with the higher pressure on the gas side 48), the article can be formed in the mold within a time frame of less than or equal to 3 minutes, specifically, less than or equal to two minutes. In forming a transparent polycarbonate article as described herein (e.g., at just above HDT of the polycarbonate, and within such a time frame (e.g., less than 5 minutes), any distortion in the polycarbonate during the molding process is desirably minimized. Furthermore, the polycarbonate can be molded using pressure forming described herein without any pre-drying of the polymer (e.g., polycarbonate), thereby removing a production step that is generally included in the molding of materials using other techniques. In other words, the polycarbonate is heated without being first subjected to an active step of drying or otherwise removing moisture in an oven, desiccator, or the like.

COMPARATIVE EXAMPLES

Figure 2:
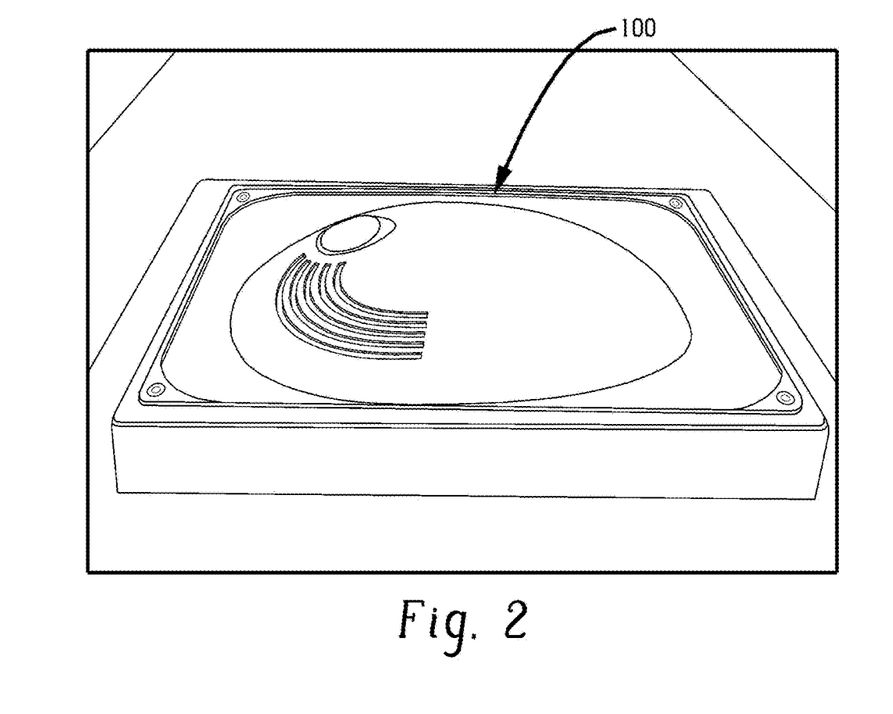
FIG. 2 is a photograph of a mold for a drape vacuum forming process.

Referring now to FIG. 2, a mold for a typical vacuum forming process is generally shown and designated by the reference number 100. The mold 100 was used to vacuum form polycarbonate into a part having a complex shape. Samples of the polycarbonate were pre-dried in an oven at 120 degrees C. for over 12 hours. The mold 100 was used in a vacuum forming process employing a Cannon Shelly PF1010 vacuum forming machine equipped with quartz heaters (available from Shelley Thermoformers Int'l Ltd., United Kingdom) and having a non-heated mold cavity that was 52 centimeters (cm) wide by 52 cm long. Surfaces defining the mold 100 were made from aluminum-filled epoxy resin.

Various experiments were performed to determine the most desirable vacuum forming process. In the initial experiments, a sample sheet was cut to 65 cm×65 cm, clamped in the mold cavity over the mold, and heated to a temperature at which forming was possible. The sample sheet was allowed to sag and, after removing the quartz heaters, the mold 100 was pushed into the sheet, vacuum was applied, the sheet was cooled, and the mold 100 was retracted from the sheet, thereby releasing the formed sheet from the mold 100. In this manner, edges of the mold 100 (in the ribbing, for example) were not suitably defined, meaning that the sheet was not formed tightly around the edges. The total cycle time (the time to load, heat, and form the sheet, and to cool and unload the formed sheet) was noted.

Subsequent experiments produced more desirable results. Processing of the polycarbonate proceeded as described above, but after removing the quartz heaters, air was blown under the heated sheet to form a cushion or bubble, the mold was pushed up partly into the heated sheet, and vacuum was applied to form the sheet over the mold 100. After cooling, the mold 100 was released from the formed sheet. The sample was analyzed to determine the quality of the forming. If the quality of forming was unacceptable (e.g., if corners and edges were not suitably defined), further experiments were pursued in which the heating time was increased until forming was acceptable. The shortest heating time to create a product of acceptable quality and the total cycle time were reported as Comparative Example C1 and C3. A second similar experiment using polyethylene terephthalate glycol (PETG) was performed, the results of which were reported as Comparative Example C2 (see Table 1 below).

EXAMPLES

A pressure forming was performed using a Niebling SAMK 400-42 forming machine (available from HDVF Kunststoffmaschinen GmbH, Penzberg, Germany) having a cavity size of 36 cm by 24.5 cm and a heated mold. The mold had the same shape as that in the vacuum form experiments of the Comparative Example. Sample materials, which included polycarbonate, were not pre-dried. A sample sheet was cut to size and drilled with holes at specific locations. The sample sheet was then automatically loaded, clamped in the frame, and heated in between both heaters. The frame was subsequently moved over the mold and formed by pushing the mold up into the heated sheet and applying pressure on the top of the heated sheet, thus pushing the sheet into the mold. After a short cooling time the mold was released and the formed sheet unloaded. The process was repeated to optimize acceptably formed articles. The shortest heating time to create a good formed article (with well-defined edges and corners in ribbing sections was reported. Total cycle time was noted. Four experiments resulted in Examples E1, E2, E3, and E4. Details are shown in Table 1.

TABLE 1

Cycle time of Forming.

| Example | Resin type[1] | Sheet gauge | Process | Mold temp (degrees C.) | Pressure (bar) | Cycle time (seconds) |
|---|---|---|---|---|---|---|
| C1 | PC[1] | 3 | Vacuum | 80 | low | 120 |
| C2 | PETG | 3 | Vacuum | 80 | low | 145 |
| C3 | PC | 6 | Vacuum | 80 | Low | 180 |
| E1 | PC | 3 | PF | 130 | 100 | 95.7 |
| E2 | PETG | 3 | PF | 60 | 80 | 59.4 |
| E3 | PC | 6 | PF | 130 | 70 | 155 |
| E4 | FMR[2] | 2 | PF | 120 | 100 | 81.6 |

[1]standard sheet grade polycarbonate; source was LEXAN™ 9030-112.
[2]sheet polycarbonate having a UV protective coating and an abrasion resistant coating (source was LEXAN™MARGARD™ FMR5 XT.).
[3]PF is pressure forming Table 1 shows the various parameters for the vacuum forming process and pressure forming process of the Examples. It can be seen that the total cycle times of processes employing pressure forming are lower than those of the vacuum forming process. In comparing pressure forming (Examples E1, E2 and E3) to the vacuum forming process of the Comparative Examples (C1, C2 and C3), it can be seen that the cycle times by product are reduced from 120 to 95.7 seconds for 3 mm polycarbonate (C1 to E1) and from 145 to 59.4 seconds for 3 mm PETG (C2 to E2) and from 180 to 155 seconds for 6 mm PC (C3 to E3).

Furthermore, it can also be seen that high gauge polycarbonate can be formed by pressure forming (Example E3), and that even 12 mm polycarbonate can be formed by this technique to achieve suitable finished products.

Figure 3:
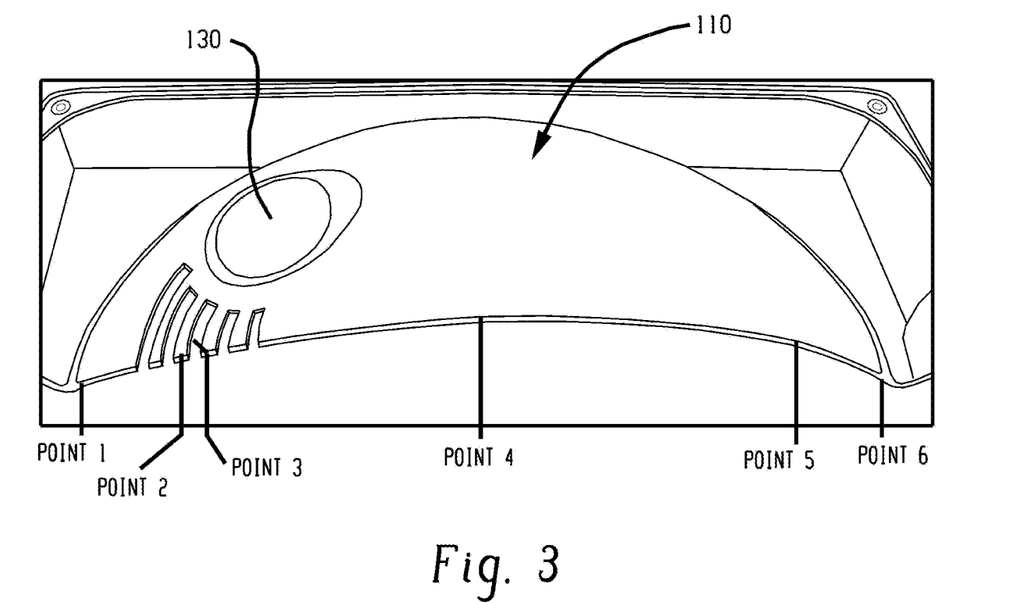
FIG. 3 is a photograph of a sectioned part formed on the mold of FIG. 2.

Moreover, it was determined that the FMR5XT cannot be formed by the vacuum forming process without the coating thereon cracking over the majority of the surface, wherein the cracks are visible to the unaided eye having normal vision (e.g., 20/20 vision). As shown in FIG. 3, a part 110 formed on the mold 100 (FIG. 2) was sectioned. With vacuum forming, the coating on the complete surface was cracked. With pressure forming only small coating cracks at point 1 and point 6 were observed where the thinning of the coating was greater than 25%. Cracks were not present with pressure forming processes in the other sections of the sample, also not in areas where the thinning was 20%. Hence, it was determined that processes utilizing pressure forming allowed for good formation of the FMR (see Example E4).

Table 2 shows comparisons of the thinning of the sample sheets at various points for the various materials (See FIG. 3). The amount of thinning was calculated using the formula:

Amount of thinning=$(1-T/T_0)\times 100$ where T is the thickness of the sheet after forming and $T_0$ is the original thickness of the sheet.

TABLE 2

Thinning of Sheet After Forming (%)

| Example | Resin type | Point 1 | Point 2 | Point 3 | Point 4 | Point 5 | Point 6 | ΔT* |
|---|---|---|---|---|---|---|---|---|
| C1 | PC | 46 | 25 | 25 | 10 | 13 | 41 | 36 |
| C2 | PETG | 46 | 26 | 22 | 19 | 18 | 40 | 28 |
| C3 | PC | 40 | 28 | 23 | 5 | 15 | 24 | 35 |
| E1 | PC | 30 | 18 | 13 | 4 | 13 | 30 | 26 |
| E2 | PETG | 27 | 18 | 13 | 7 | 15 | 33 | 26 |
| E3 | PC | 34 | 16 | 8 | 5 | 6 | 36 | 31 |
| E4 | PCFMR | 26 | 21 | 22 | 1 | 3 | 29 | 28 |

*ΔT is the change in thinning across the sheet.

As can be seen from the examples, the comparative examples had a maximum thinning of up to 46% with a thinning distribution across the sheet, a delta thinning, of 36%, 28% and 35%, respectively. The examples using the present process, however, had a total thinning of less than 40%, and mostly less than 35%, in combination with a delta thinning of less than 35%, specifically, less than or equal to 31%.

The pressure forming techniques disclosed herein (that is applying pressure to push the sheet into the mold surface) provide advantages over vacuum forming and other processes for forming polymer parts. In particular, the quality of parts formed by pressure forming is superior to the quality of parts formed by the other processes for several reasons. The quality of the parts can be expressed in at least three aspects. First, the quality can be related to the distribution of thickness at various points in the sheet forming the part. In forming the part, the sheet is stretched and is therefore thinner than before being inserted into the mold. The thinning is preferably minimal (e.g., the thinning is less than or equal to 50%, specifically, less than or equal to 45%, and more specifically, less than or equal to 40%, and even less than or equal to 35%) and equally distributed over substantially the entire area of the sheet (e.g., the difference in thinning across the sheet is less than or equal to 40%, specifically, less than or equal to 35%, and more specifically, less than or equal to 30%), thereby avoiding having thinner areas (relative to other areas of the sheet).

Figure 4:
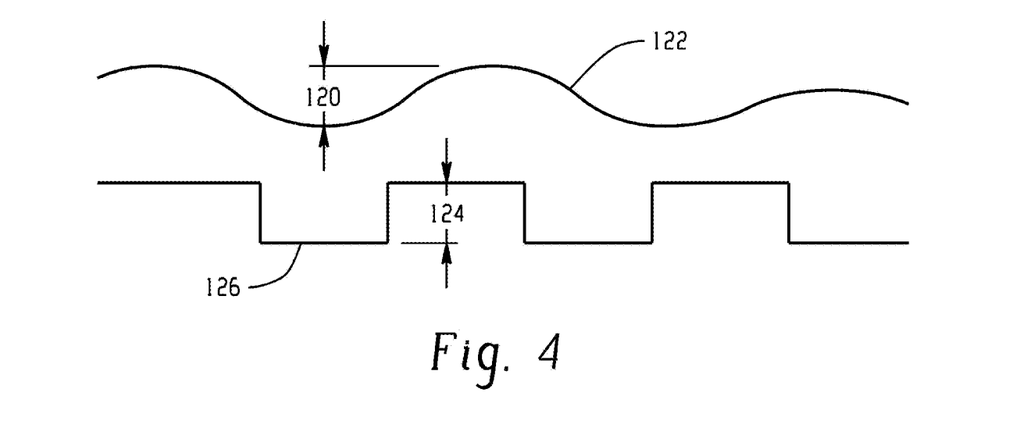
FIG. 4 is a schematic drawing of profile measurements taken on a part formed of polycarbonate sheet.

Second, the shape of the formed parts using pressure forming is superior to the shapes of formed parts made by other methods. Unlike vacuum and other vacuum forming techniques, use of pressure forming to mold polycarbonate in particular allows for edges and corners to be sufficiently defined (particularly in ribbed areas of the article). To assess whether the corners were sufficiently defined, samples were cut from formed parts and inspected under 10× power magnification. Depths, angles, and thicknesses (an average of three measurements was taken for each) were compared using a calibration grid. As shown in FIG. 4, distances 120 were measured in a top profile 122 of the formed part (crest to trough) as well as distances 124 in a bottom profile 126 (defining ribbing). The results are set forth in Table 3, wherein Example E4 (FMR5XT) particularly showed superior forming in sections of the parts defining the ribbing.

TABLE 3

| Example | Resin type | Top profile article (mm) | Bottom profile article (mm) |
|---|---|---|---|
| C1 | PC | 6.3 | 7.7 |
| C2 | PETG | 4.7 | 7.3 |

TABLE 3-continued

| Example | Resin type | Top profile article (mm) | Bottom profile article (mm) |
|---|---|---|---|
| C3 | PC | 0.3 | 5.2 |
| E1 | PC | 10 | 7.3 |
| E2 | PETG | 6 | 7 |
| E3 | PC | 1.7 | 8.7 |
| E4 | PCFMR | 10 | 8.3 |

Figure 5A:
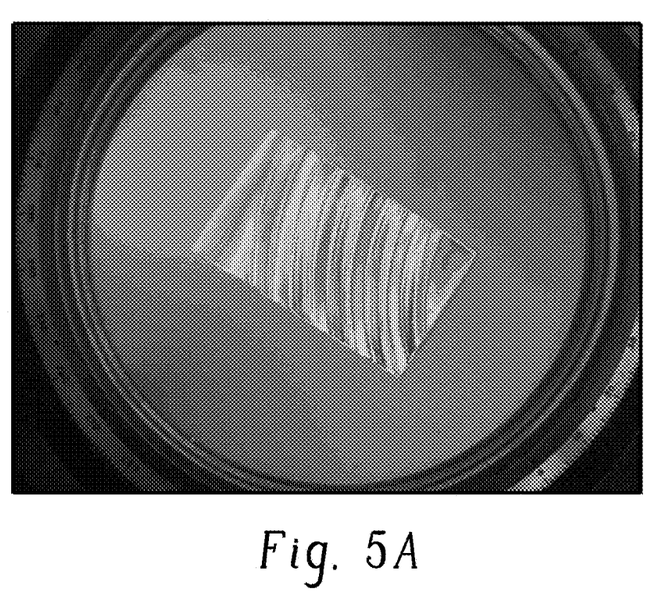
FIG. 5A is an image between two polarizers at a 90° angle (cross polarized light) of vacuum formed polycarbonate in a rib area of a formed part.
Figure 5B:
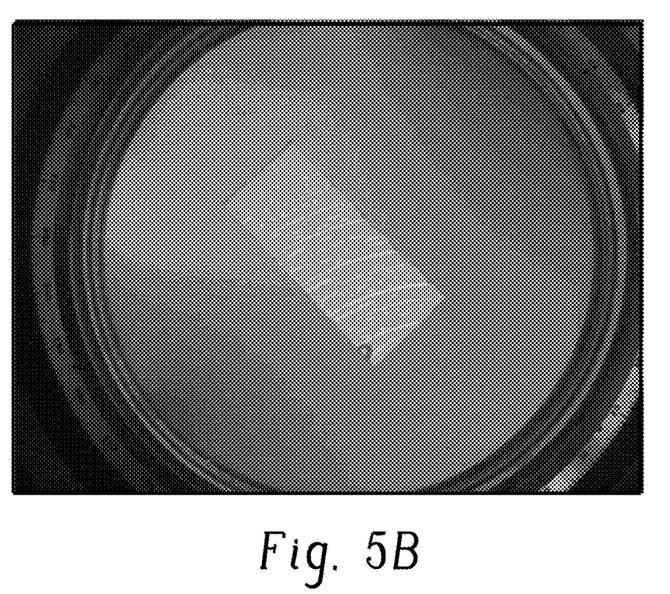
FIG. 5B is an image between cross polarized light of a rib area of a polycarbonate part formed by a pressure forming technique.
Figure 6A:
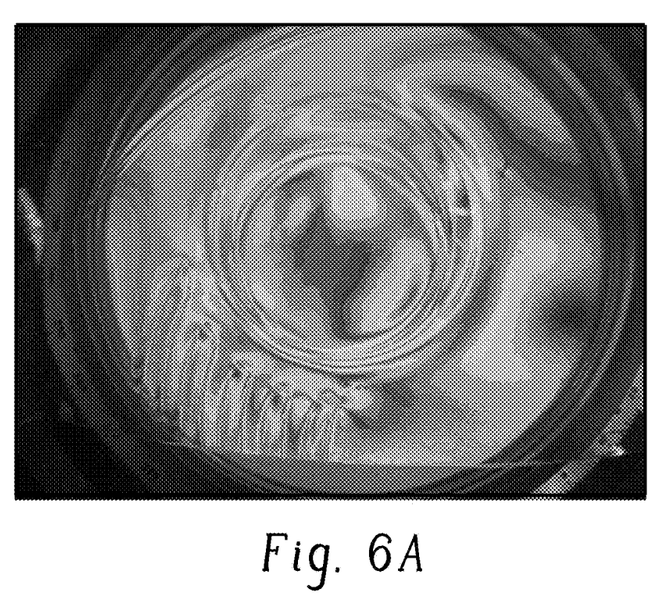
FIG. 6A is an image between cross polarized light of vacuum formed polycarbonate in a dot area of a formed part.
Figure 6B:
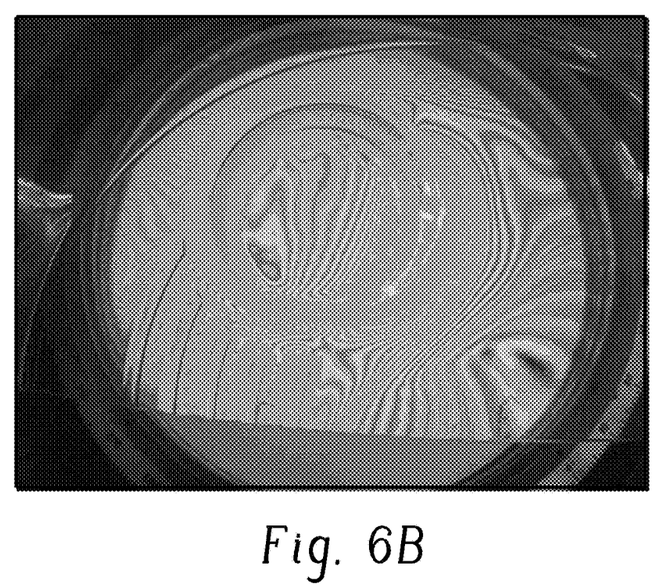
FIG. 6B is an image between cross polarized light of a dot area of a polycarbonate part formed by a pressure forming technique.
Figure 7A:
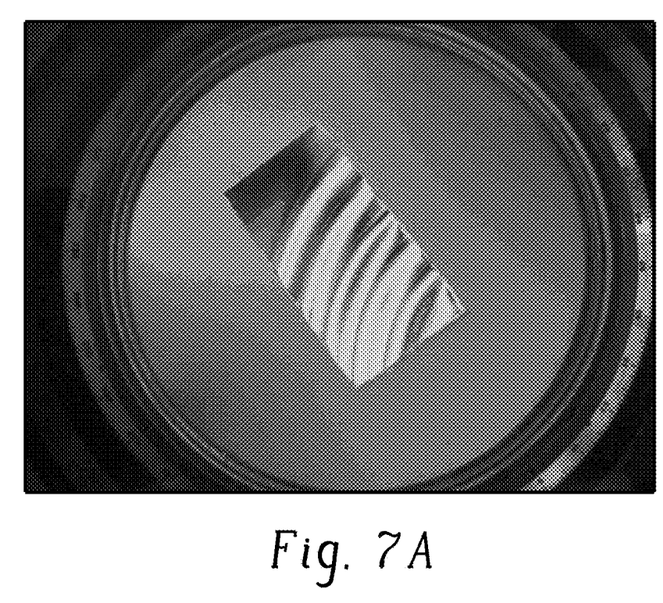
FIG. 7A is a between cross polarized light of vacuum formed polyethylene terephthalate glycol in a rib area of a formed part.
Figure 7B:
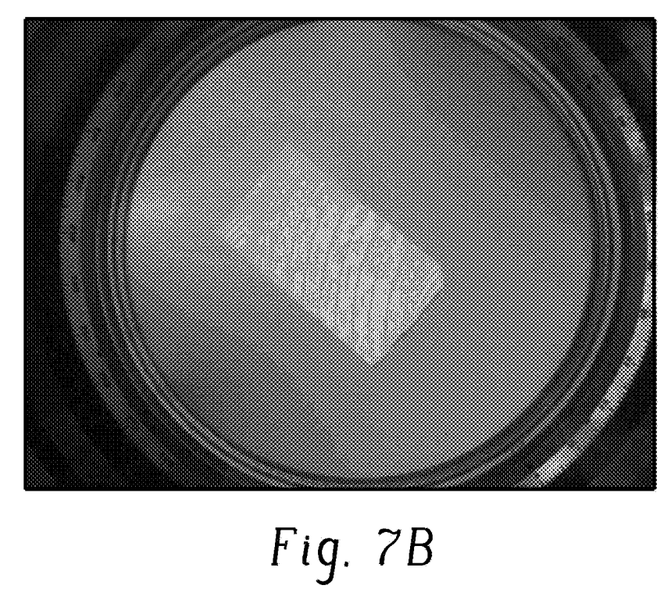
FIG. 7B is an image between cross polarized light of a rib area of a polyethylene terephthalate glycol part formed by a pressure forming technique.
Figure 8A:
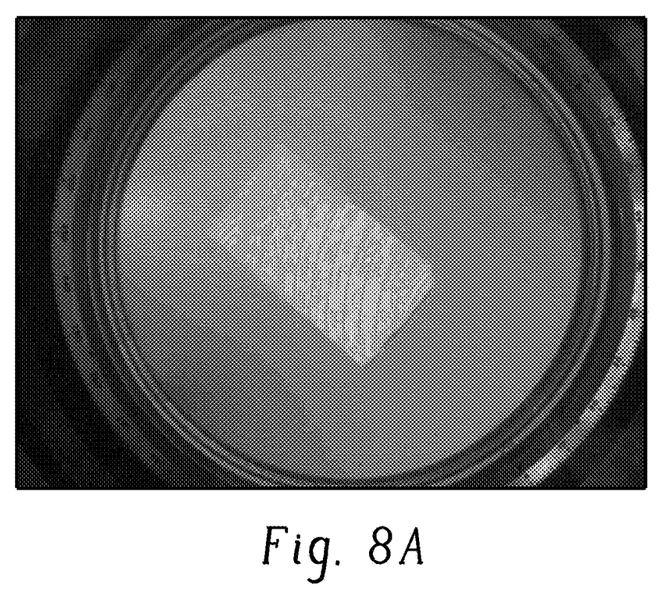
FIG. 8A is a between cross polarized light of vacuum formed polyethylene phthalate glycol in a dot area of a formed part.
Figure 8B:
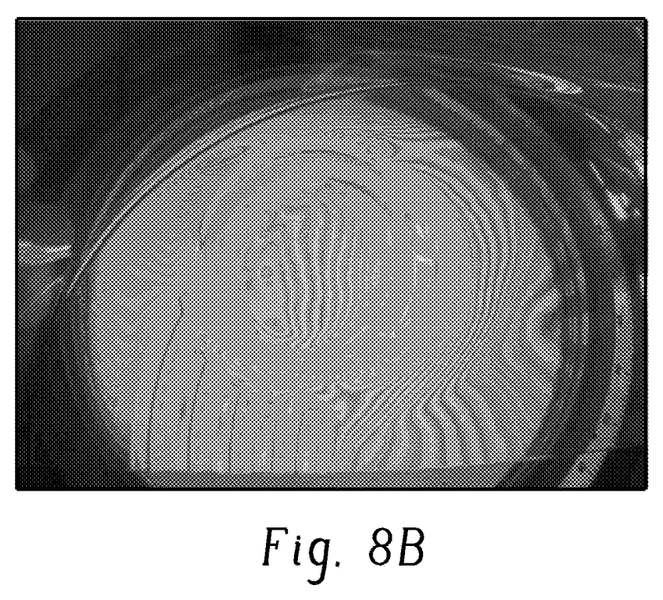
FIG. 8B is a between cross polarized light of a dot area of a polyethylene terephthalate glycol part formed by a pressure forming technique.

Third, stress and stress distribution is improved in parts formed using pressure forming techniques as disclosed herein. High stress and uneven stress distribution in the formed parts are undesirable since such stress and uneven distribution may compromise the overall properties of the parts, particularly with regard to impact properties. Stress can be detected using cross polarized light by placing a sample part between two polarized sheets with the polarizations oriented in perpendicular directions. The detection of more colors in the sheets means more stress is present in the part. Referring to FIGS. 5A and 5B, it can be seen that polycarbonate formed by pressure forming has less colors in a rib area (FIG. 5B) than vacuum formed polycarbonate (FIG. 5A) in the same area and that the color pattern is divided over the sample part more evenly, meaning that less stress has been formed by pressure forming technique than by vacuum forming Similar results can be seen in FIGS. 6A and 6B, where polycarbonate formed by pressure forming has less colors in a dot area (see area 130 in FIG. 3) than vacuum formed polycarbonate (FIG. 6A) in the same area. Similar results again are observed with regard to polyethylene terephthalate glycol in the rib areas (FIGS. 7A and 7B) and in the dot areas (FIGS. 8A and 8B).

Another advantage to processes utilizing pressure forming as described herein is cost savings. The costs of molds for producing parts using pressure forming is generally about an order of magnitude less than the costs of molds for making the same parts using injection molding. Other equipment costs (e.g., injection molding machines and pressure forming machines) are comparable. No predrying is necessary, facilitating substrate handling and making a drying oven and its operation obsolete.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants, or species used in the prior art compositions or that are otherwise not necessary to the achievement of the function and/or objectives of the present invention.

Set forth below are some embodiments of the methods disclosed herein.

Embodiment 1: A method for forming a transparent article, comprising: non-contact heating a polymer sheet to form a heated sheet; creating a pressure differential across the heated sheet; pushing the heated sheet onto the contoured surface to form a shaped article; and releasing the shaped article from the mold, wherein the sheet has a thickness of greater than 0.75 mm.

Embodiment 2: A method for forming a transparent article, comprising: non-contact heating a polymer sheet to form a heated sheet; creating a pressure differential across the heated sheet; isostatically forming the heated sheet to a contoured surface to form a shaped article; and releasing the shaped article from the mold, wherein the sheet has a thickness of greater than 0.75 mm.

Embodiment 3: A method for forming a polycarbonate article, comprising: heating a transparent polycarbonate sheet to form a heated sheet, having a transparency of greater than or equal to 1% measured according to ASTM D1003-00, Procedure A using an integrating sphere (0°/diffuse geometry) under standard lamp D65; creating a pressure differential across the heated sheet; pushing the heated sheet onto the contoured surface to form a shaped article; and releasing the shaped article from the mold; wherein the polycarbonate sheet comprises greater than or equal to 50 wt % polycarbonate based upon a total weight of the polycarbonate sheet; wherein the polycarbonate sheet has at least one of a UV protective coating and an abrasion-resistant coating.

Embodiment 4: The method of any of Embodiments 1-3, wherein the thickness is greater than 2 mm.

Embodiment 5: The method of any of Embodiments 1-4, wherein the thickness is greater than 2.5 mm.

Embodiment 6: The method of any of Embodiments 1-4, wherein the thickness is greater than 2 mm to 18 mm.

Embodiment 7: The method of any of Embodiments 1-6, wherein the heating is to a temperature of the sheet of material of greater than HDT to (HDT+40° C.) as determined by ISO75-2.

Embodiment 8: The method of Embodiment 7, wherein the temperature is (HDT+5° C.) to (HDT+30° C.) as determined by ISO75-2.

Embodiment 9: The method of any of Embodiments 1-8, wherein the pressure differential is less than 300 bar.

Embodiment 10: The method of Embodiment 9, wherein the pressure differential is 1 less than 200 bars.

Embodiment 11: The method of any of Embodiments 1-10, wherein a time for forming the shaped article from the polymer sheet is less than or equal to 10 minutes.

Embodiment 12: The method of any of Embodiments 1-11, wherein a time for forming the shaped article from the polymer sheet is less than or equal to 5 minutes.

Embodiment 13: The method of any of Embodiments 1-12, wherein a time for forming the shaped article from the polymer sheet is less than or equal to 3 minutes.

Embodiment 14: The method of any of Embodiments 1 and 4-13, wherein the polymer sheet is 1 mm to 12 mm thick.

Embodiment 15: The method of any of Embodiments 1-13, wherein the polymer sheet is 2.5 mm to 15 mm thick.

Embodiment 16: The method of any of Embodiments 1-15, wherein the shaped article has a difference in thinning across the shaped article of less than or equal to 35%, or less than or equal to 25%, less than or equal to 20%.

Embodiment 17: The method of any of Embodiments 1-16, wherein the shaped article has no cracks visible to the unaided eye having normal vision.

Embodiment 18: The method of any of Embodiments 1-17, wherein the heating is not achieved by high-frequency heating.

Embodiment 19: The method of any of Embodiments 1-18, wherein the heating is to a temperature of the sheet of material of 10 to 65° C. above the Vicat softening temperature B/50, wherein the Vicat softening temperature B/50 is determined according to ISO 306 (50 N; 50° C./h), or 15 to 65° C. above the Vicat softening temperature B/50, or 20 to 65° C. above the Vicat softening temperature B/50, or 25 to 60° C. above the Vicat softening temperature B/50.

Embodiment 20: The method of any of Embodiments 1-19, wherein the heating is achieved by way of radiant heating, optionally with the aid of infrared radiation.

Embodiment 21: The method of any of Embodiments 1-20, wherein the pressure differential is greater than or equal to 40 bars, or greater than or equal to 50 bars, or greater than or equal to 70 bars.

Embodiment 22: The method of any of Embodiments 1-21, comprising no predrying (i.e., no heating for greater than or equal to 15 minutes to dry the sheet before forming the shaped article).

Embodiment 23: The method of any of Embodiments 1-22, wherein prior to the heating, the polymer sheet is flat.

Embodiment 24: The method of any of Embodiments 1-23, further comprising mounting the polymer sheet on a frame, wherein only edge sections of the polymer sheet are lying on the frame. Embodiment 25: The method of any of Embodiments 1-24, isostatically forming the heated sheet to produce the shaped article.

Embodiment 25: The method of Embodiment 24, wherein the shaped article is formed in less than or equal to 5 seconds.

Embodiment 26: The method of any of Embodiments 1-25, wherein the polymer sheet comprises polycarbonate.

Embodiment 27: The method of any of Embodiments 1-26, wherein the polymer sheet further comprises a drape formable coating, wherein the drape formable coating comprises at least one of a UV protective coating and an abrasion-resistant coating.

Embodiment 28: An article formed by the method of any of Embodiments 1-27.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. The suffix "(s)" as used herein is intended to include both the singular and the plural of the term that it modifies, thereby including one or more of that term (e.g., the sheet(s) includes one or more sheets). Reference throughout the specification to "one embodiment," "another embodiment," "an embodiment," and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments. Unless specified to the contrary herein, all test standards are the most recent standard in effect at the time of filing this application.

All cited patents, patent applications, and other references are incorporated herein by reference in their entirety. However, if a term in the present application contradicts or conflicts with a term in the incorporated reference, the term from the present application takes precedence over the conflicting term from the incorporated reference. U.S. Provisional Application No. 61/867,784, filed on Aug. 20, 2013, is hereby incorporated by reference in its entirety.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for forming a transparent article, comprising:
   non-contact heating a polymer sheet to form a heated sheet, wherein the polymer sheet has a thickness of greater than 2.5 mm;
   creating a pressure differential across the heated sheet to push the heated sheet onto a contoured surface of a mold to form a shaped article; and
   releasing the shaped article from the mold;
   wherein the shaped article has a difference in thinning across the shaped article of less than or equal to 35%;
   wherein, without pre-drying the polymer sheet, a total cycle time for heating and forming the shaped article from the polymer sheet is less than or equal to 10 minutes.

2. A method for forming a transparent article, comprising:
   non-contact heating a polymer sheet to form a heated sheet, wherein the polymer sheet has a thickness of greater than 2.5 mm;
   creating a pressure differential across the heated sheet;
   isostatically forming the heated sheet onto a contoured surface to form a shaped article; and
   releasing the shaped article from the mold;
   wherein the shaped article has a difference in thinning across the shaped article of less than or equal to 35%;
   wherein, without pre-drying the polymer sheet, a total cycle time for heating and forming the shaped article from the polymer sheet is less than or equal to 10 minutes.

3. A method for forming a polycarbonate article, comprising:
   heating a transparent polycarbonate sheet to form a heated sheet, having a transparency of greater than or equal to 1% measured according to ASTM D-1003-00 Procedure B, Spectrophotometer, using illuminant C with diffuse illumination and unidirectional viewing, wherein the polycarbonate sheet has a thickness of greater than 2.5 mm;
   creating a pressure differential across the heated sheet to push the heated sheet onto a contoured surface of a mold to form a shaped article; and
   releasing the shaped article from the mold;
   wherein the polycarbonate sheet comprises greater than or equal to 50 wt % polycarbonate based upon a total weight of the polycarbonate sheet;
   wherein the polycarbonate sheet has at least one of a UV protective coating and an abrasion-resistant coating; and
   wherein the shaped article has a difference in thinning across the shaped article of less than or equal to 35%;
   wherein, without pre-drying the polymer sheet, a total cycle time for heating and forming the shaped article from the polymer sheet is less than or equal to 10 minutes.

4. The method of claim 1, wherein the thickness is greater than or equal to 3.0 mm.

5. The method of claim 1, wherein the thickness is 3 mm to 18 mm.

6. The method of claim 1, wherein the heating is to a temperature of the heated sheet of greater than HDT to (HDT+40° C.) as determined by ISO75-2.

7. The method of claim 6, wherein the temperature is (HDT+5° C.) to (HDT+30° C.) as determined by ISO75-2.

8. The method of claim 1, wherein the heating is to a temperature of the sheet of material of 10 to 65° C. above the Vicat softening temperature B/50, wherein the Vicat softening temperature B/50 is determined according to ISO 306 (50 N; 50° C./h).

9. The method of claim 1, wherein the pressure differential is less than 300 bar.

10. The method of claim 9, wherein the pressure differential is less than 200 bars.

11. The method of claim 1, wherein a time for forming the shaped article from the polymer sheet is less than or equal to 5 minutes.

12. The method of claim 11, wherein a time for forming the shaped article from the polymer sheet is less than or equal to 3 minutes.

13. The method of claim 1, wherein the shaped article has no cracks visible to the unaided eye having normal vision.

14. The method of claim 1, wherein the heating is achieved by way of radiant heating with the aid of infrared radiation.

15. The method of claim 1, wherein the polymer sheet comprises polycarbonate.

16. The method of claim 1, wherein the polymer sheet further comprises a drape formable coating, wherein the drape formable coating comprises at least one of a UV protective coating and an abrasion-resistant coating.

17. The method of claim 1, comprising no heating for greater than or equal to 15 minutes to dry the heated sheet before forming the shaped article.

18. The method of claim 1, wherein the heating is to a temperature of the heated sheet of (HDT+5° C.) to (HDT+30° C.) as determined by ISO75-2.

* * * * *